(12) United States Patent
Ogawa

(10) Patent No.: US 6,925,049 B2
(45) Date of Patent: Aug. 2, 2005

(54) OPTICAL RECORDING MEDIUM AS WELL AS METHOD AND DEVICE FOR RECORDING AND READING SAME

(75) Inventor: Masatsugu Ogawa, Tokyo (JP)

(73) Assignee: NEC Corporation (JP)

( * ) Notice: Subject to any disclaimer, the term of this patent is extended or adjusted under 35 U.S.C. 154(b) by 266 days.

(21) Appl. No.: 10/092,105

(22) Filed: Mar. 6, 2002

(65) Prior Publication Data

US 2002/0126600 A1 Sep. 12, 2002

(30) Foreign Application Priority Data

Mar. 5, 2001 (JP) ......................................... 2001-059807
Mar. 6, 2001 (JP) ......................................... 2001-062216

(51) Int. Cl.⁷ .............................. G11B 7/24; G11B 7/05
(52) U.S. Cl. ................................. 369/275.4; 369/47.27
(58) Field of Search ........................... 369/44.26, 275.3, 369/275.4, 47.27, 47.22, 47.31, 47.47, 53.29

(56) References Cited

U.S. PATENT DOCUMENTS 6,292,458 B1 * 9/2001 Eguchi et al. ............ 369/275.4

FOREIGN PATENT DOCUMENTS

| JP | 09-326138 | 12/1997 |
|---|---|---|
| JP | 11-025460 | 1/1999 |

* cited by examiner

Primary Examiner—Thang V. Tran
(74) Attorney, Agent, or Firm—Hayes Soloway P.C.

(57) ABSTRACT

In a wobble-format type optical recording medium 10 involving a guide groove 11 wherein the guide groove is allowed to meander over substantially the whole length thereof to form wobble, and wobbled intermittent sections 12 where there are no meandrous area are placed at predetermined positions in the wobble; a first wobbled intermittent section 12a for determining reference position is disposed at at least one reference position A in the optical recording medium, and furthermore, a second wobbled intermittent section 12b is disposed selectively at each predetermined position B apart from each reference position by a predetermined distance.

30 Claims, 10 Drawing Sheets

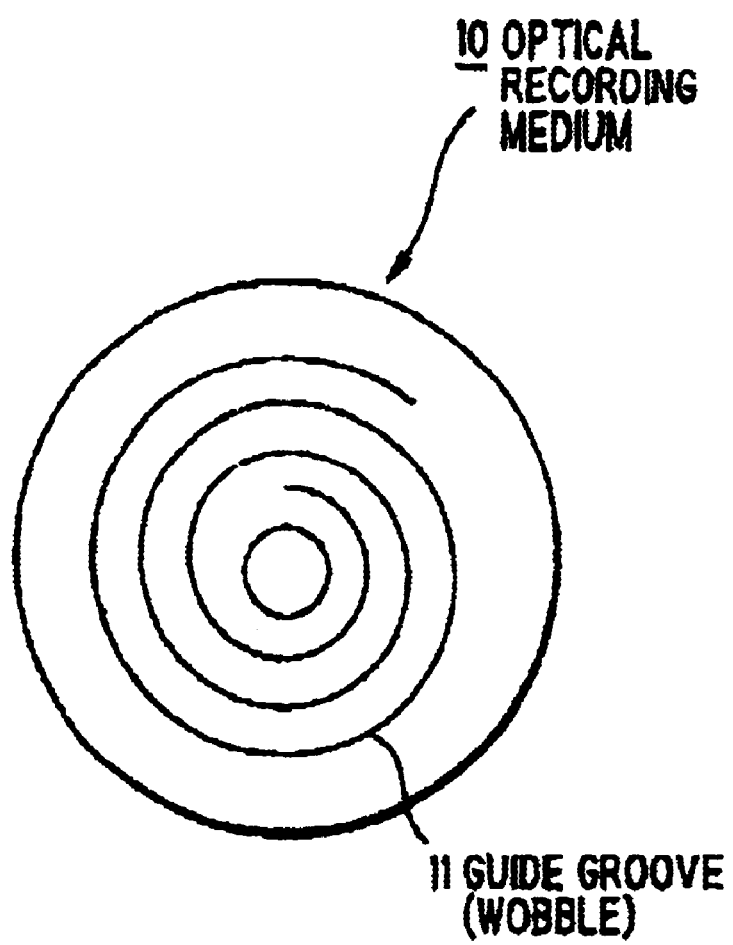

FIG.5
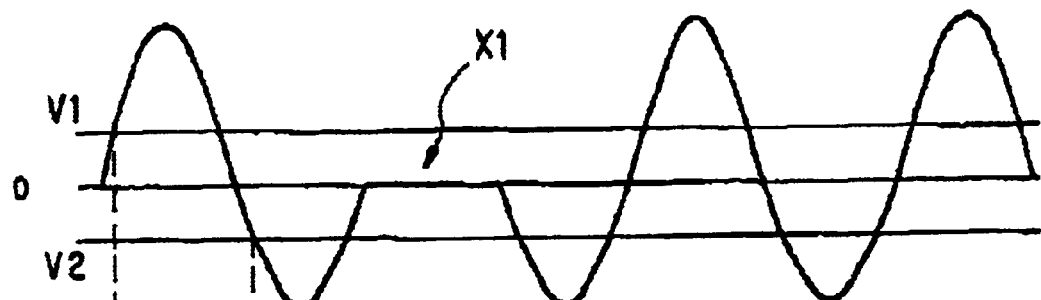
(A) PUSH-PULL SIGNAL
(B) OUTPUT OF COMPARATOR 31
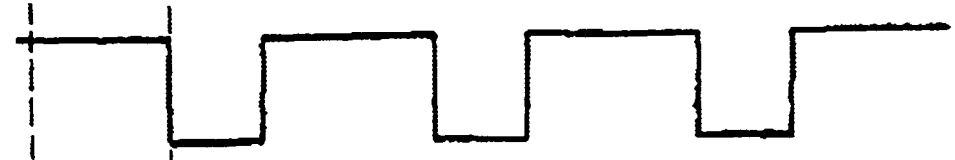
(C) OUTPUT OF COMPARATOR 32
(D) REFERENCE SIGNAL
(E) DETECTION SIGNAL

FIG. 6
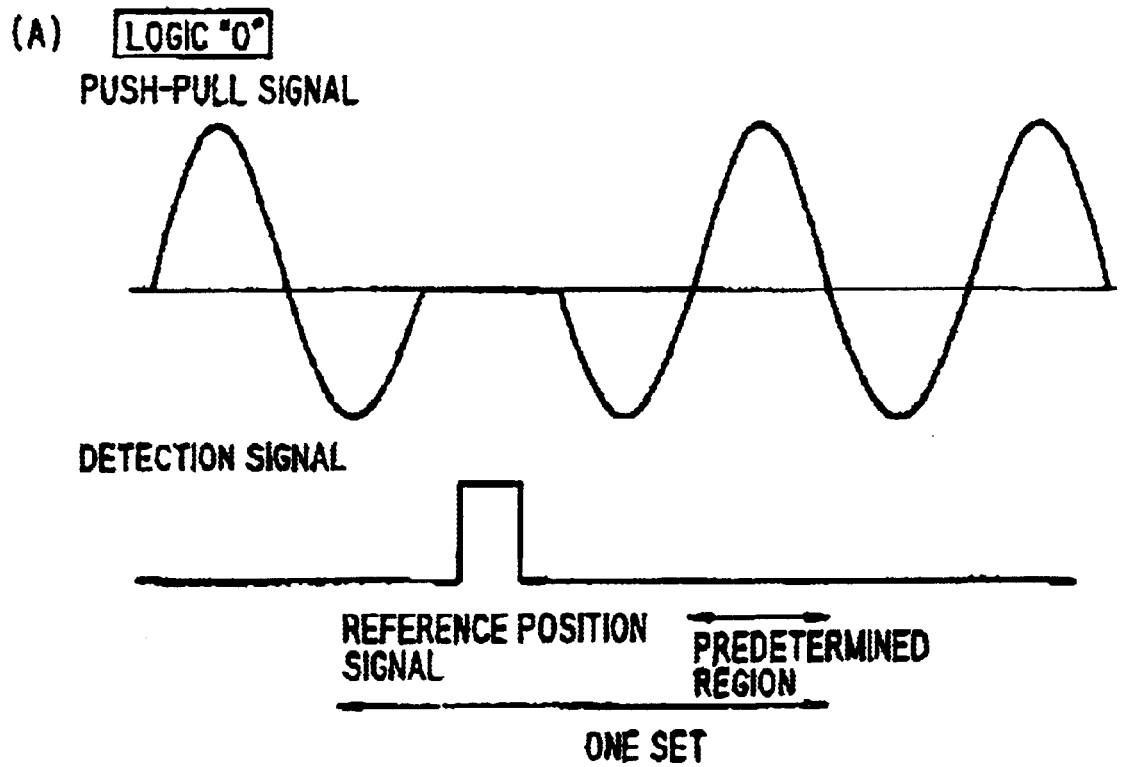
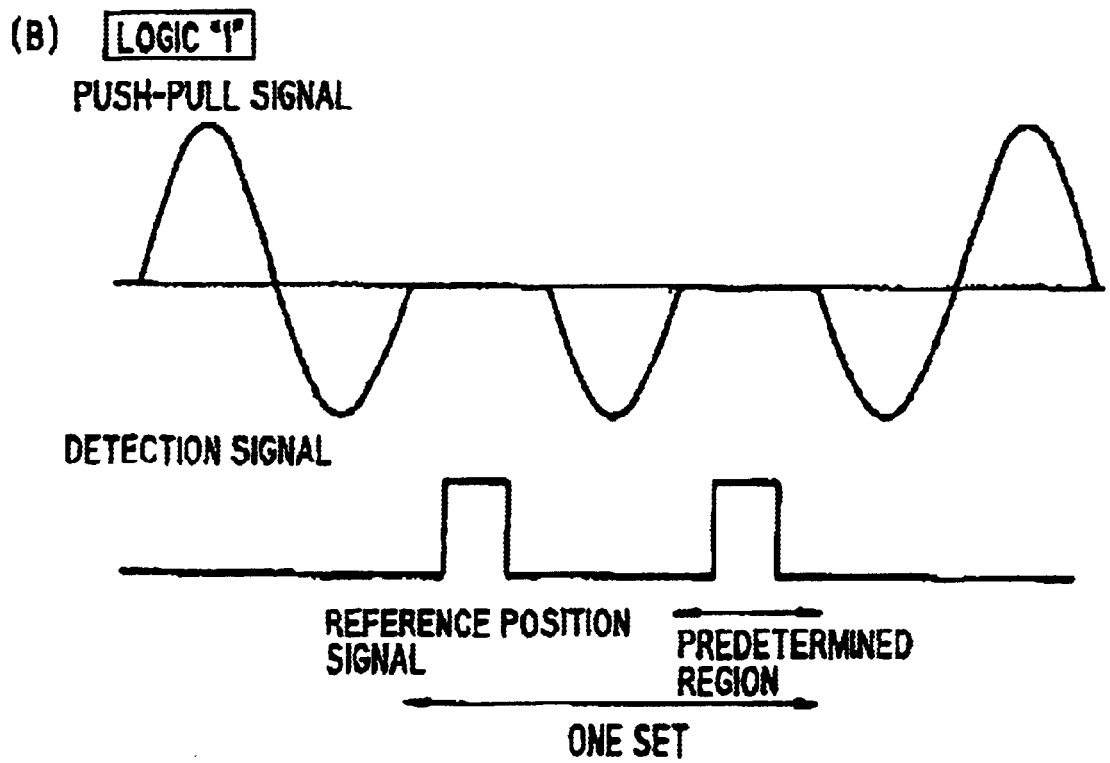

FIG. 8
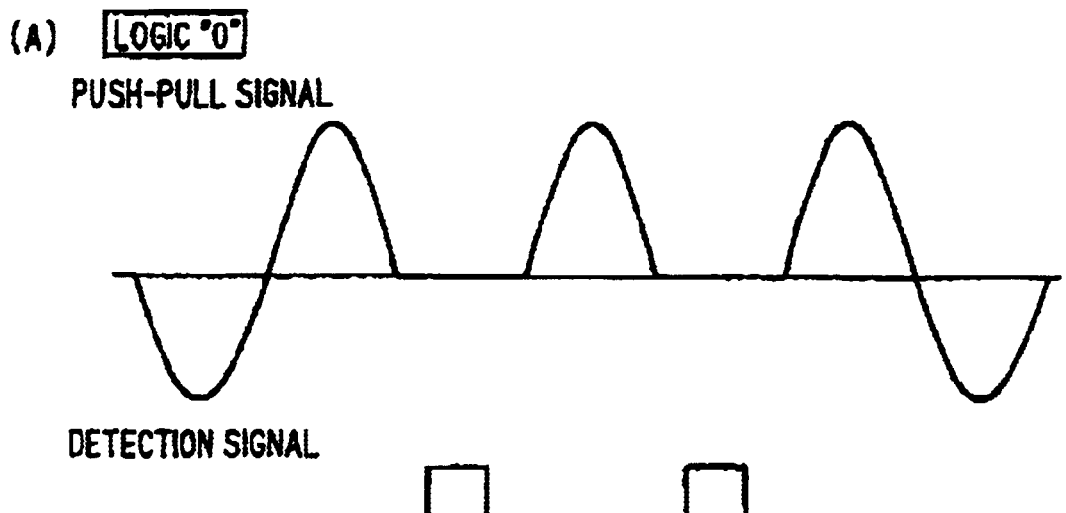
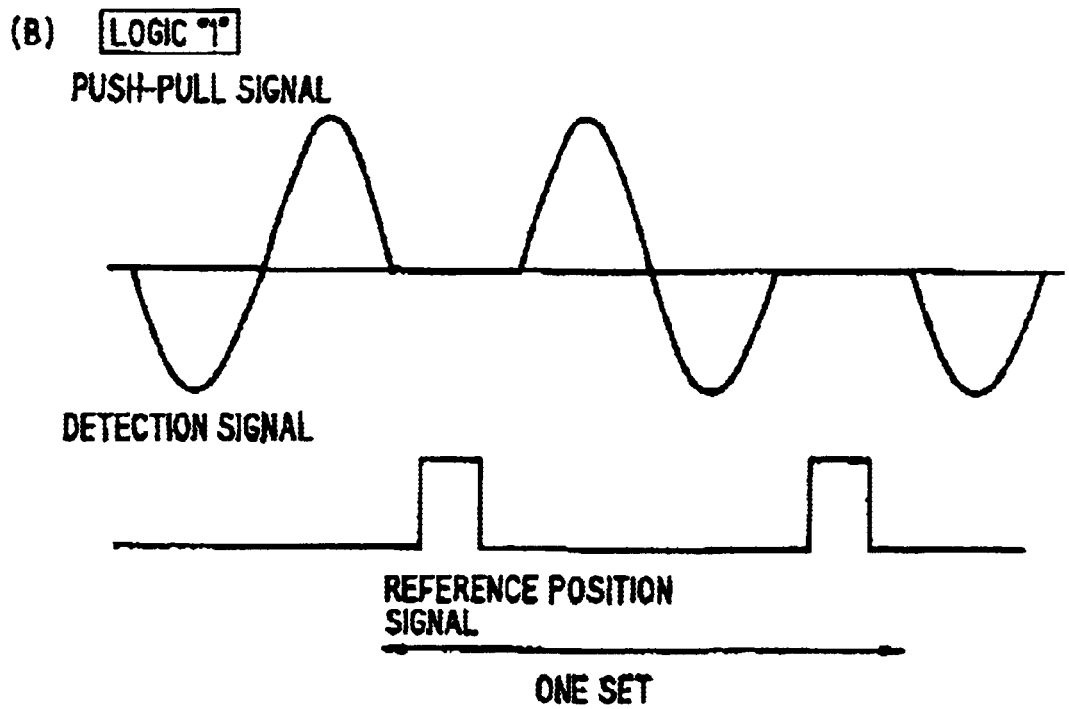

FIG. 10
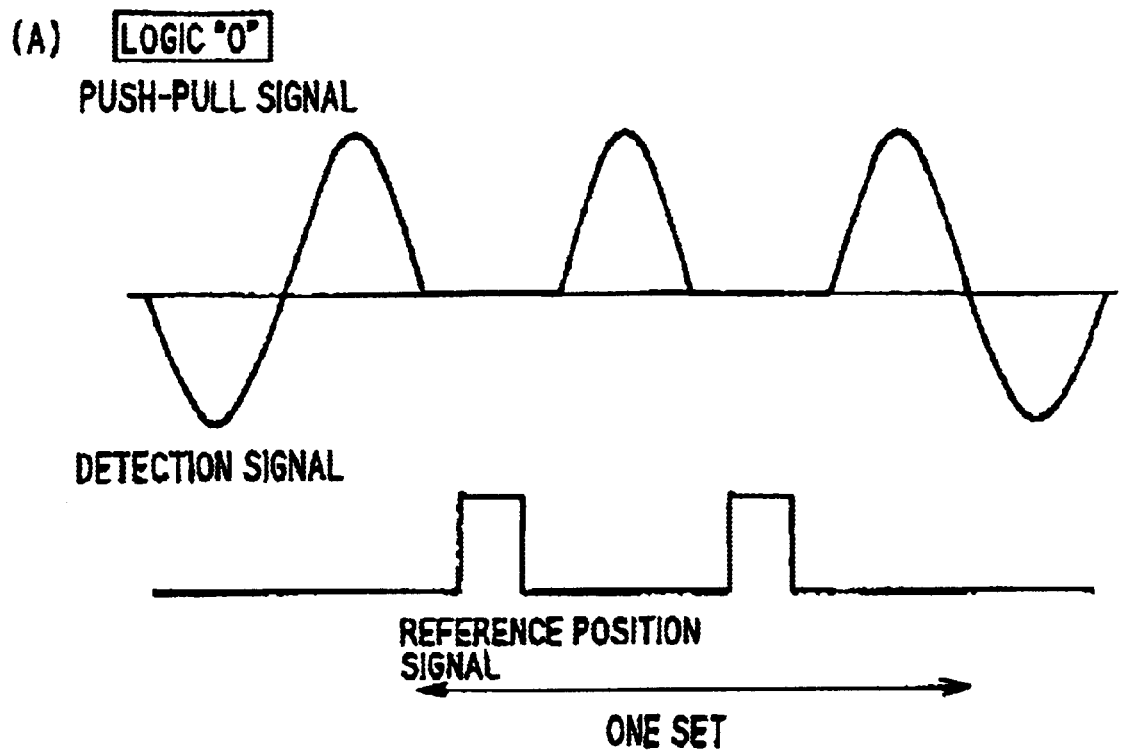
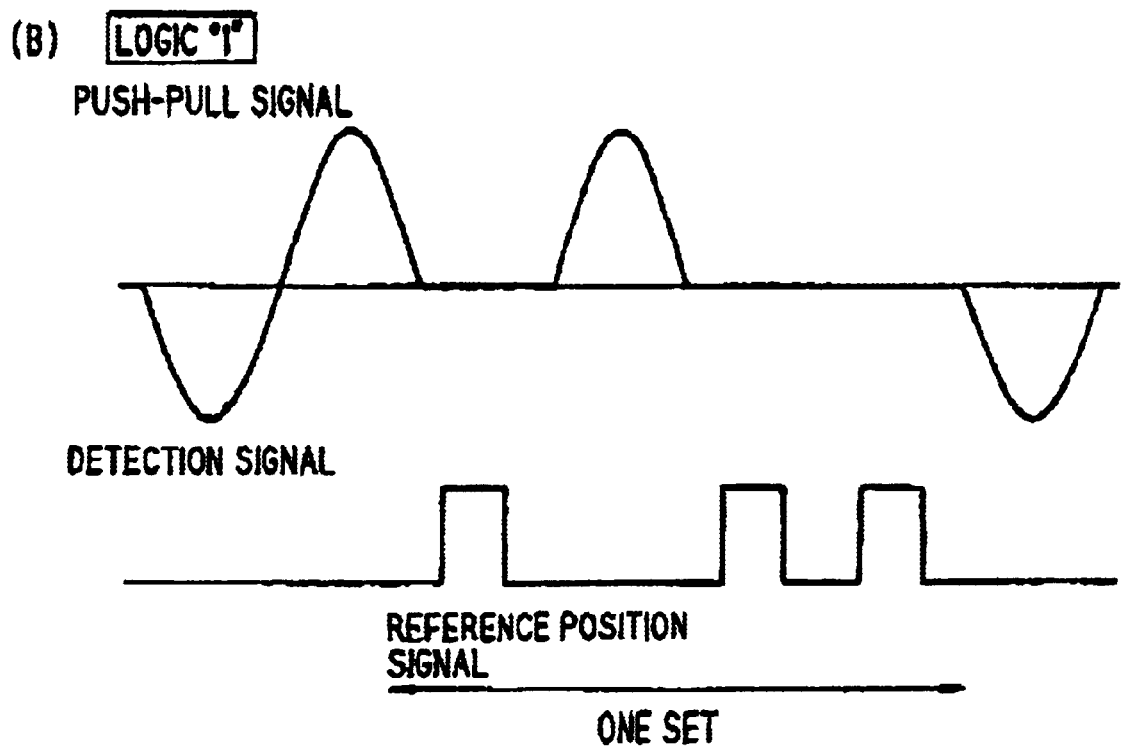

OPTICAL RECORDING MEDIUM AS WELL AS METHOD AND DEVICE FOR RECORDING AND READING SAME

FIELD OF THE INVENTION

The present invention relates to a high density optical recording medium as well as to a method and device for recording and reading the same.

BACKGROUND OF THE INVENTION

Heretofore, optical recording media such as MO, MD, CD-R, DVD-R, DVD-RW, and DVD+RW have been known as the one wherein so-called wobble which makes grooves being guide grooves to be a meandering state with a predetermined period. Such optical recording medium is arranged so as to utilize wobble for synchronization of rotation or to represent information by such wobble.

In this case, modes for utilization of wobble in these optical recording media may be classified into some types.

First, in case of MD and CD-R, wobble is modulated to represent information. Namely, wobble is FM-modulated to embed address information and the like in such MD or CD-R.

Such technique as described above has been clearly expressed, for example, in the accompanying drawings of Japanese Laid-Open No. 25460/1999.

Incidentally, a tendency of high density in magneto optical recording technology progresses in recent years. With such progress, a track pitch for an optical recording medium is narrowed increasingly. As a result, leakage of wobble signals from grooves constituting adjacent tracks becomes higher in so-called wobble signals, whereby an S/N ratio in the wobble signals reduces remarkably. In the case where FM modulation is applied to wobble signals, when leakage of the wobble signals from the above-mentioned adjacent grooves increases, it becomes difficult to discriminate a frequency of the leakage signal from that of information to be read, because the frequency of wobble is not constant. Thus, it becomes hard to read correctly information contained in the wobble.

In order to solve such problems as described above, there is a manner, which has been adopted, for example, in DVD-R and DVD-RW.

The manner has been disclosed in Japanese Patent Laid-Open No. 326138/1997 wherein pits are defined between wobbled grooves, and information is embedded in these pits, such pits being called by the name of land pre-pits (LPP).

In this manner, however, since pits are defined adjacent to grooves, data signals residing adjacent to the pits are influenced. Thus, there has been a problem of easy appearance of erroneous detection of data. Besides, the LPP themselves are affected also by data signals of adjacent grooves, so that there has been a problem of easy appearance of erroneous detection of LPPs.

On one hand, information is embedded in wobble itself in case of DVD+RW with a different form from that of the above-mentioned MD and CD-R. The manner for embedding information has been described in detail in written standards of EDMA wherein a wobble phase is deviated at a predetermined position by 180 degrees, and information is embedded by the use of the deviated wobble phase as a trigger.

In this manner, however, since the wobble phase is deviated too hastily, fabrication of a base plate for optical recording media is difficult so that scattering results occur easily in recorded signals. More specifically, when a block error rate (BLER: One (1) block is 1 ADIP Word) of the signals is measured by the use of a disk tester, it was confirmed that the block error rate was around 15% before recording data, while it was around 75% after recording data, and hence, the reading thereof was difficult.

According to such manner for representing information by wobble or a manner for affording information by the use of LPPs as mentioned above, format efficiency is very good so that it is suited for attaining high density as compared with an optical recording medium such as DVD-RAM wherein an address pit is formed on a head of data.

However, any of the above-mentioned conventional wobble formats involves both merits and demerits.

SUMMARY OF THE INVENTION

The present invention has been made to solve the above. described problems. Accordingly, objects of the present invention is to provide an optical recording medium with a wobble format, which is easily manufactured, favorable in reading function thereof, and most suitable for attaining high density, as well as to provide a method and a device for recording and reading such optical recording medium.

In order to achieve the above-described objects, an optical recording medium involving a guide groove wherein the guide groove is allowed to meander over substantially the whole length thereof to form wobble, and wobbled intermittent sections where there is no meandrous area are placed at predetermined positions in the wobble, comprises a first wobbled intermittent section for determining reference position being disposed at at least one reference position in the optical recording medium; and furthermore, a second wobbled intermittent section being disposed selectively at each predetermined position apart from each reference position by a predetermined distance.

Moreover, in order to achieve the above-described objects, an optical recording medium involving a guide groove wherein the guide groove is allowed to meander over substantially the whole length thereof to form wobble, and wobbled intermittent sections where there is no meandrous area are placed at predetermined positions in the wobble, comprises a first wobbled intermittent section for determining reference position being disposed at at least one reference position in the optical recording medium; and furthermore, third wobbled intermittent sections being disposed selectively at at least one predetermined position apart from each reference position by each predetermined distance differing from one another.

Furthermore, in order to achieve the above-described objects, an optical recording medium involving a guide groove wherein the guide groove is allowed to meander over substantially the whole length thereof to form wobble, and wobbled intermittent sections where there is no meandrous area are placed at predetermined positions in the wobble, comprises a first wobbled intermittent section for determining reference position being disposed at at least one reference position in the optical recording medium; and furthermore, fourth wobbled intermittent sections each having a different length from one another being disposed selectively at each predetermined position apart from each reference position by a predetermined distance.

According to such constitution of an optical recording medium as described above, since wobbled intermittent sections representing logic signals corresponding to information to be recorded are disposed in wobble derived from a meandrous guide groove, information contained in the wobble can be correctly read in compliance with high density of the optical recording medium as compared with a conventional case wherein wobble is FM-modulated or pits are disposed between grooves.

Since information is represented herein by wobbled intermittent sections, data signals to be recorded in an optical recording medium are neither affected adversely by the wobbled intermittent sections unlike the case of LPP, nor the information represented by the wobbled intermittent sections are affected by the data signals.

In this case, since wobbled intermittent sections may be disposed in any part of the wobble to be formed in an optical recording medium, it is possible to embed information represented by such wobbled intermittent sections over the whole surface of the optical recording medium.

In such case, a second, a third, or a fourth wobbled intermittent section in which information is actually to be embedded has been placed at a predetermined position with respect to a first wobbled intermittent section, which was disposed at a reference position, so that there is no case where a wobbled intermittent section cannot obtain consecutively wobble signals. Thus, rotational control of an optical recording medium utilizing wobble signals is correctly effected.

In any of the optical recording media as described above, the first, the second, the third, or the fourth wobbled intermittent section may have a length corresponding to natural number-fold of a half cycle of the part other than the wobbled intermittent section in the above-described wobble.

According to such constitution of the optical recording media as described above, portions of wobble positioned before and after a wobbled intermittent section are formed in such that wobbled intermittent sections appear on a part of consecutive wobble, whereby wobble signals can be easily obtained.

Furthermore, a method for recording and reading signals with respect to any of the optical recording media described above comprises the steps of detecting a first wobbled intermittent section for determining reference position placed at at least one reference position in the optical recording medium from push-pull signals detected from wobble; thereafter, detecting a wobbled intermittent section or wobbled intermittent sections other than the first wobbled intermittent section each of which is selectively disposed at a predetermined position apart from the reference position by a predetermined distance; and utilizing information which has been recorded in the wobbled intermittent section or sections other than the first wobbled intermittent section to record or read the signals with respect to the optical recording medium.

According to such constitution of the method for recording and reading signals with respect to an optical recording medium as described above, since wobbled intermittent sections representing logic signals corresponding to information to be recorded are disposed in wobble derived from a meandrous guide groove of the optical recording medium, information contained in the wobble can be correctly read in compliance with high density of the optical recording medium as a result of detecting correctly the wobbled intermittent sections in comparison with a conventional case wherein wobble is FM-modulated or pits are disposed between grooves.

Since information is represented herein by wobbled intermittent sections, data signals to be recorded in an optical recording medium are neither affected adversely by the wobbled intermittent sections unlike the case of LPP, nor the information represented by the wobbled intermittent sections are affected by the data signals.

In this case, a second, a third, or a fourth wobbled intermittent section in which information is actually to be embedded has been placed at a predetermined position with respect to a first wobbled intermittent section, which was disposed at a reference position, so that there is no case where a wobbled intermittent section cannot obtain consecutively wobble signals. Thus, rotational control of an optical recording medium utilizing wobble signals is correctly effected in case of recording and reading the optical recording medium.

Besides, the first wobbled intermittent section, which has been formed at the reference position of the optical recording medium, is detected, and then, the second, the third, or the fourth wobbled intermittent section, which has been placed at each predetermined position with respect to the reference position, is detected, so that these wobbled intermittent sections can be correctly detected.

In the method for recording and reading signals with respect to an optical recording medium as described above, the signals represented by the wobbled intermittent sections may be detected by means of two comparators in each of which the upper limit is compared with the lower limit with respect to the push-pull signals as well as of reference signals in synchronization with wobble signals.

In the method for recording and reading signals with respect to an optical recording medium as described above, one of the two comparators detects a first level or higher levels of the push-pull signals, the other comparator detects a second level or lower levels of the push-pull signals, and the detection signals obtained from these comparators may be compared with the reference signals, whereby signals from the wobbled intermittent sections are detected.

According to such constitution of the method for recording and reading signals with respect to an optical recording medium as described above, signals represented by the wobbled intermittent sections can be detected from the push-pull signals obtained by wobble in accordance with such simple constitution.

In this case, even if detection signals of a comparator are output from, for example, a part other than the wobbled intermittent sections due to noise and the like, signals derived from the wobbled intermittent sections are not detected without accompanying reference signal, so that the signals represented by the wobbled intermittent sections can be more correctly detected.

In the method for recording and reading signals with respect to an optical recording medium as described above, each cycle of the reference signals may correspond to each half cycle of the push-pull signals.

According to such constitution of the method for recording and reading signals with respect to an optical recording medium as described above, portions of wobble positioned before and after a wobbled intermittent section are formed in such that wobbled intermittent sections appear on a part of consecutive wobble, whereby wobble signals can be easily obtained.

Furthermore, a device for recording and reading signals with respect to any one of the optical recording media described above comprises a first wobbled intermittent section for determining reference position placed at at least one reference position in the optical recording medium from push-pull signals detected from wobble; a wobbled intermittent section detecting section for detecting a wobbled intermittent section or wobbled intermittent sections other than the first wobbled intermittent section each of which is selectively disposed at a predetermined position apart from the reference position by a predetermined distance; and a control section for taking out information, which has been recorded in the wobbled intermittent section or sections other than the first wobbled intermittent section, based on detection signals from the wobbled intermittent section detecting section and utilizing the information thereby to record or read signals with respect to the optical recording medium.

As mentioned above, according to an optical medium of the present invention, even if a pitch defined between adjacent tracks is narrowed due to a realization of high density, neither there is a case where data signals are adversely affected, nor, on the contrary, it is affected by such data signals. Accordingly, information represented by wobbled intermittent sections can be correctly detected.

BRIEF DESCRIPTION OF THE DRAWINGS

The present invention will be explained in more detail in conjunction with appended drawings, wherein:

FIG. 1 is a schematic plan view showing an optical recording medium according to a first embodiment of the present invention;

FIGS. 2(A) and 2(B) are enlarged views of wobbled intermittent sections in the optical recording medium shown in FIG. 1 wherein FIG. 2(A) illustrates logic information "0" represented by wobbled intermittent sections, and FIG. 2(B) illustrates logic information "1" represented by wobbled intermittent sections;

FIGS. 5(A), 5(B), 5(C), 5(D), and 5(E) are time charts each showing a detection condition of a wobbled intermittent section by means of the wobbled intermittent section detection circuit of FIG. 4;

FIGS. 6(A) and 6(B) are graphical representations in case of detecting the wobbled intermittent sections of FIG. 2 wherein FIG. 6(A) indicates a push-pull signal corresponding to wobbled intermittent sections representing the logic information "0" and a detection signal of the wobbled intermittent section detection circuit as to the logic information "0", and FIG. 6(B) indicates a push-pull signal corresponding to a wobbled intermittent sections representing the logic information "1" and a detection signal of the wobbled intermittent section detection circuit as to the logic information "1";

FIGS. 7(A) and 7(B) are enlarged views of wobbled intermittent sections in an optical recording medium according to a second embodiment of the present invention wherein FIG. 7(A) illustrates logic information "0" represented by wobbled intermittent sections, and FIG, 7(B) illustrates logic information "1" represented by wobbled intermittent sections;

FIGS. 8(A) and 8(B) are graphical representations in case of detecting the wobbled intermittent sections of FIG. 7 wherein FIG. 8(A) indicates a push-pull signal corresponding to wobbled intermittent sections representing the logic information "0" and a detection signal of the wobbled intermittent section detection circuit as to the logic information "0", and FIG. 8(B) indicates a push-pull signal corresponding to wobbled intermittent sections representing the logic information "1" and a detection signal of the wobbled intermittent section detection circuit as to the logic information "1";

FIGS. 9(A) and 9(B) are enlarged views of wobbled intermittent sections in an optical recording medium according to a third embodiment of the present invention wherein FIG. 9(A) illustrates logic information "0" represented by wobbled intermittent sections, and FIG. 9(B) illustrates logic information "1" represented by wobbled intermittent sections; and FIGS. 10(A) and 10(B) are graphical representations in case of detecting the wobbled intermittent sections of FIG. 9 wherein FIG. 10(A) indicates a push-pull signal corresponding to wobbled intermittent sections representing the logic information "0", and a detection signal of the wobbled intermittent section detection circuit as to the logic information "0", and FIG. 10(B) indicates a push-pull signal corresponding to wobbled intermittent sections representing the logic information, "1"and a detection signal of the wobbled intermittent section detection circuit as to the logic information "1".

DESCRIPTION OF THE PREFERRED EMBODIMENTS

In the following, preferred embodiments of the present invention will be described in detail in conjunction with the accompanying drawings.

At the beginning, a first embodiment of an optical recording medium according to the present invention will be described by referring to FIG. 1.

Figure 2A:
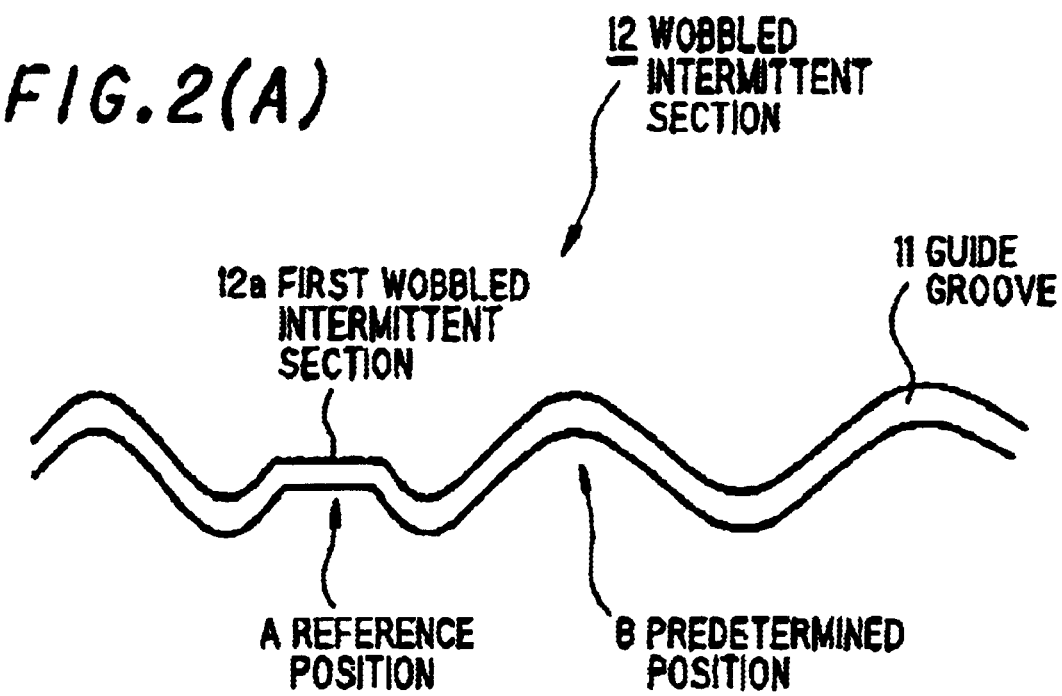
Figure 2B:
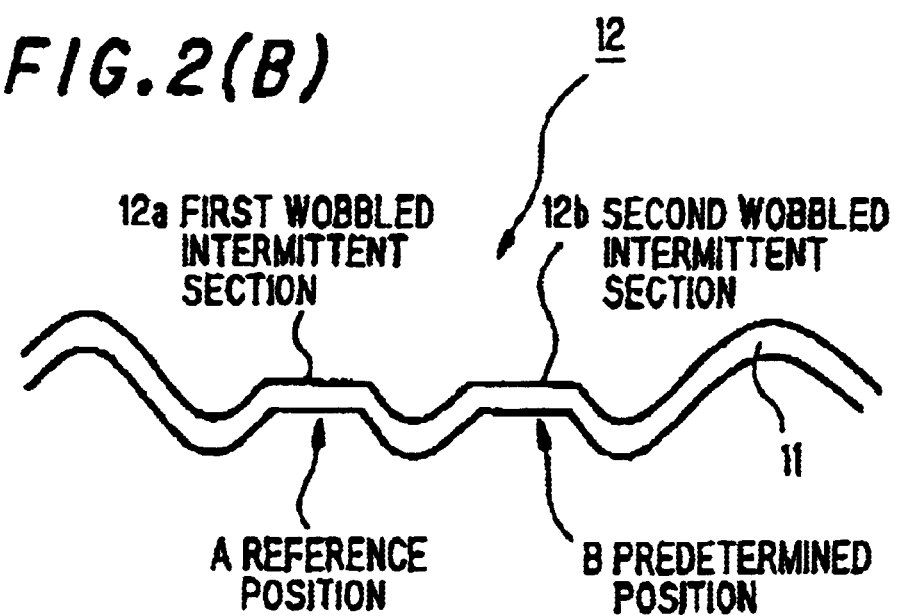

FIG. 1 is a schematic plan view showing the first embodiment of an optical recording medium according to the present invention, and FIGS. 2(A) and 2(B) are partially enlarged plan views each showing an enlarged guide groove in the optical recording medium of FIG. 1.

In FIG. 1, the optical recording medium 10 contains a spiral groove 11 over substantially the whole surface thereof. The guide groove 11 involves wobbled sections as a result of forming them in a meandrous configuration at a predetermined cycle, while the guide groove 11 involves at least one wobbled intermittent section with no meandrous configuration 12 as shown in FIGS. 2(A) and 2(B).

The wobbled intermittent sections 12a and 12b have been constituted as shown in FIGS. 2(A) and 2(B).

First, in FIG. 2(A), the wobbled intermittent section 12 involves a first wobbled intermittent section 12a for determining reference position at a reference position A, but does not involve another wobbled intermittent section at a predetermined position B, which is apart from the reference position A by a predetermined distance. In this case, the wobbled condition maintains without accompanying any modification in a region covering the predetermined position B.

On one hand, in FIG. 2(B), the wobbled intermittent section 12 involves also the first wobbled intermittent section 12a for determining reference position at one reference position A as shown in FIG. 2(A), besides it involves also a second wobbled intermittent section 12b at a predetermined position B, which is apart from the reference position A by a predetermined distance, As described above, the wobbled intermittent section 12 involves the second wobbled intermittent section 12b at the predetermined position B, whereby the logic information "1" is represented.

More specifically, as described above, it is arranged in such that the wobbled intermittent section 12 involves the first wobbled intermittent section 12a for determining reference position at the reference position A, besides whether the second wobbled intermittent section 12b is involved or not at the predetermined position B apart from the reference position A by the predetermined distance to constitute a set of wobbled intermittent sections, whereby the logic information "0", or the logic information "1" are represented.

Before and after the wobbled intermittent section 12a or 12b, a phase of the guide groove 11 may be curved either outwardly or inwardly (either the upper or the lower side is applicable in the drawing), but preferable is that the phase is configured in a manner wherein wobble that is essentially to be present in a region covering the wobbled intermittent section 12a or 12b disappears as shown in FIG. 2(A) or 2(B). According to such configuration as described above, signals from wobble itself come to be easily obtained, in case of reading an optical recording medium.

Figure 3:
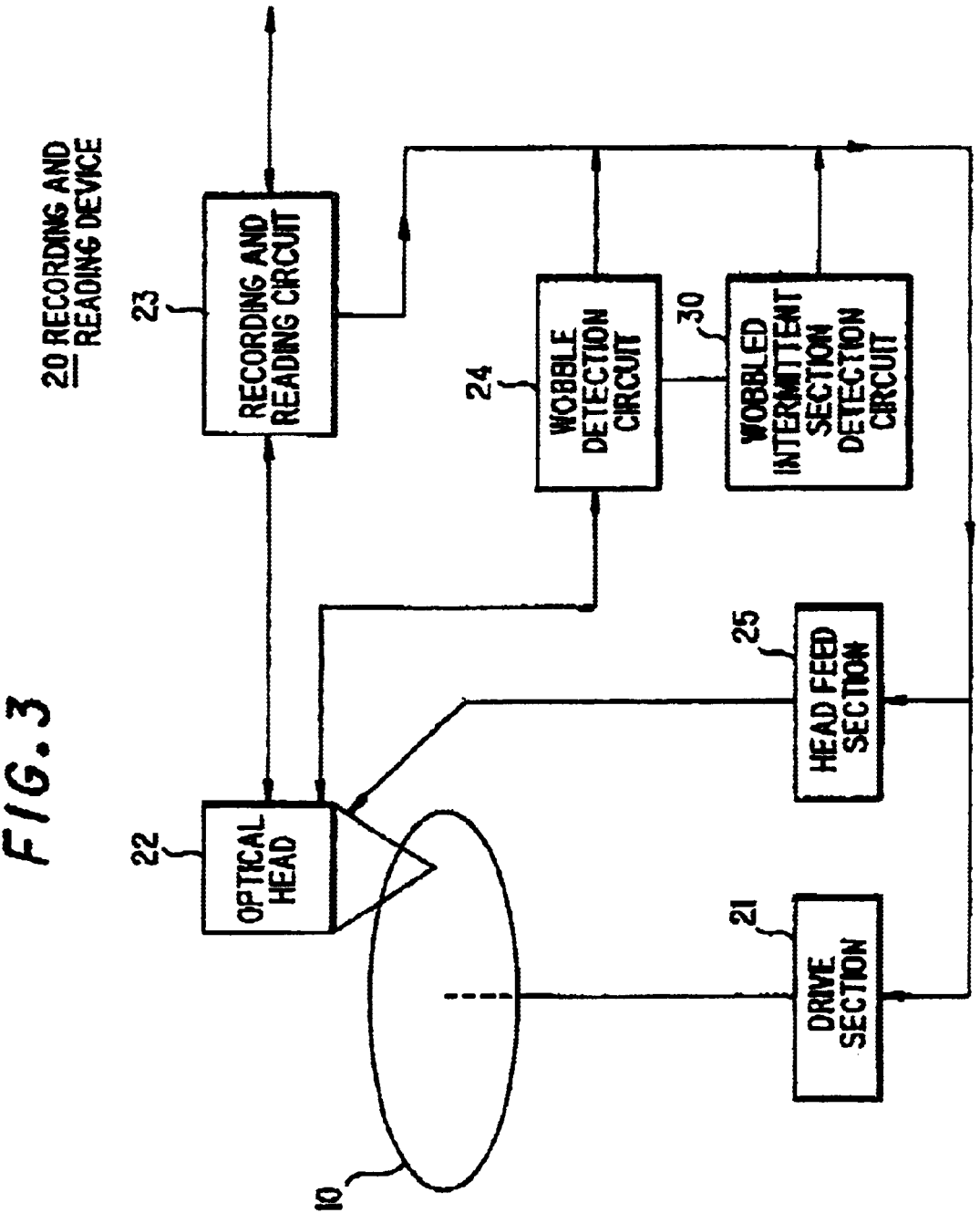
FIG. 3 is a block diagram showing a constitution of an embodiment of a recording and reading device for optical recording media according to the present invention.

FIG. 3 shows a constitution of an embodiment of a recording and reading device for optical recording media according to the present invention wherein the recording and reading device 20 for optical recording media is provided with a drive section 21, an optical head 22, a recording and reading circuit 23, a wobble detection circuit 24, a head feed section 25, and a wobbled intermittent section detection circuit 30 for detecting wobbled intermittent sections.

The drive section 21 drives rotationally the optical recording medium 10 at a predetermined rate; and, for example, a spindle motor is used as the drive section 21.

The optical head 22 is constituted in such that it emits light beam on a signal recording surface of the optical recording medium 10 to detect the light beam returned from the signal recording surface.

The recording and reading circuit 23 is arranged in such that information, which has been recorded in the optical recording medium 10 is read on the basis of detection signals from the optical head 22, while the optical head 22 is driven on the basis of signals to be recorded in the optical recording medium 10, whereby optical signals are delivered with respect to the optical recording medium 10.

The wobble detection circuit 24 detects push-pull signals (wobble signals) derived from wobble in the optical recording medium 10 based on detection signals from the optical head 22, and the resulting signals are used for rotation and synchronization of the optical recording medium 10, or they are utilized as reference signals. Furthermore, the wobbled intermittent section detection circuit 30 detects address information from the optical head 22

The head feed section 25 is arranged in such that it drives and controls the optical head 22 so as to oppose to a predetermined track position in the optical recording medium 10 based on signals from the recording and reading circuit 23 and address information from the wobbled intermittent section detection circuit 30.

The drive section 21 is also arranged in such that it drives and controls the optical recording medium 10 based on signals from the recording and reading circuit 23 and address information from the wobbled intermittent section detection circuit 30 as in the case of the head feed section 25.

In accordance with the recording and reading device 20 constituted as described above, when the optical recording medium 10 is read, a push-pull signal as shown in FIG. 5(A) is obtained.

The push-pull signal has, for example, a substantially sinusoidal waveform dependent on wobble, besides, the signal takes zero level at the respective wobble intermittent sections 12a and 12b as represented by reference character X1 in FIG. 5(A).

Although the above-described constitution is substantially the same as that of a conventional recording and reading device for an optical recording medium 10, the recording and reading device 20 according to an embodiment of the present invention differs from a conventional one in that the recording and reading device 20 of the present embodiment is provided with the wobbled intermittent section detection circuit 30.

Figure 4:
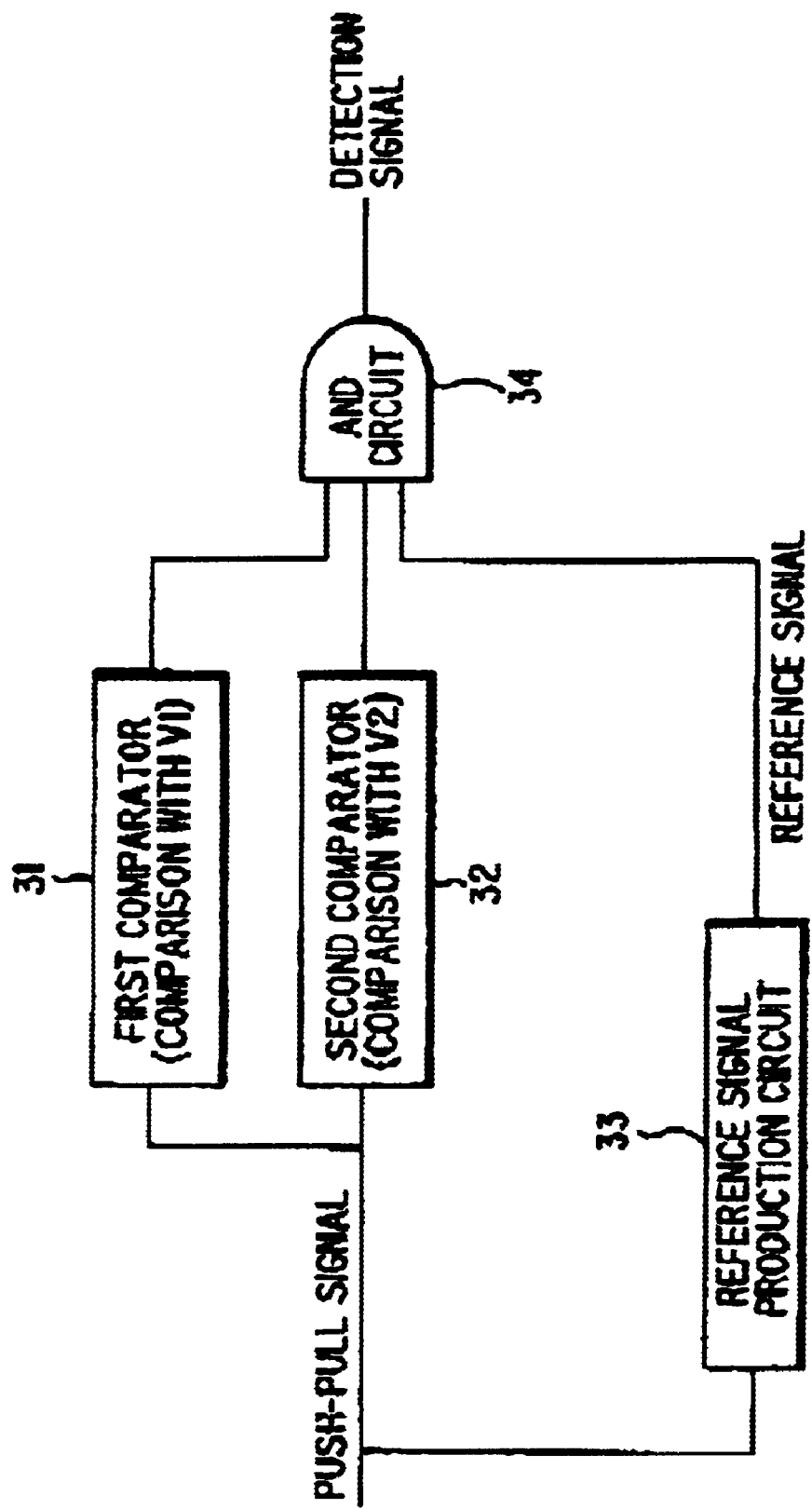
FIG. 4 is a block diagram showing a constitutional example of a wobbled intermittent section detection circuit in a recording and reading device for optical recording media of FIG. 3.

The wobbled intermittent section detection circuit 30 is composed of a first comparator 31 and a second comparator 32 to which are input respectively push-pull signals from a wobble detection circuit 24, a reference signal production circuit for producing reference signals, and AND circuit 34 to which output signals from two of the comparators 31 and 32 as well as reference signals from the reference signal production circuit 33 are input, respectively, as shown in FIG. 4.

The first comparator 31 is constituted in such that a push-pull signal to be input is compared with a reference level V1 on a plus (+) side, so that a detection signal of L level is output in the case where the push-pull signal is higher than the reference level V1.

On one hand, the second comparator 31 is constituted in such that a push-pull signal to be input is compared with a reference level V2 on a minus (−) side, so that a detection signal of L level is output in the case where the push-pull signal is lower than the reference level V2.

Furthermore, the reference signal production circuit 33 produces a reference signal as shown in FIG. 5(D) by means of a pulse signal of a half cycle of such push-pull signal (wobble signal) based on a push-pull signal from the wobble detection circuit 24.

Thus, according to the wobbled intermittent section detection circuit 30 having such constitution as described above, when a push-pull signal from the wobble detection circuit 24 is input to the first and the second comparators 31 and 32 in the case where the optical recording medium 10 is recorded or read, an output signal shown in FIG. 5(B) is output from the first comparator 31, while an output signal shown in FIG. 5(C) is output from the second comparator 32.

As a result, the AND circuit 34 outputs one pulse signal in response to a signal of zero (0) level at the wobbled intermittent section 12 based on the output signals from the respective comparators 31 and 32 as well as the above-described reference signal as shown in FIG. 5(E).

Hence, the wobbled intermittent detection circuit 30 detects the wobbled intermittent section 12.

In this case, even if either of the comparators 31 and 32 acts erroneously in a region other than the wobbled intermittent section 12, the wobbled intermittent section detection circuit 30 does not output a detection signal for the wobbled intermittent section, because there is no reference signal so that an output of the AND circuit 34 is maintained at L level.

In the following, a method for recording and reading an optical recording medium by means of the recording and reading device 20 for optical recording media according to the present invention will be described.

First, when the drive section 21 is driven and controlled, the optical recording medium 10 is driven rotationally at a predetermined rotational speed. As a result, the optical head 22 records signal with respect to the optical recording medium 10 based on the signals from the recording and reading circuit 23, or the optical head 22 reads the signals, which have been recorded on the optical recording medium 10.

In this case, the head feed section 25 is arranged in such that the optical head 22 tracks the optical recording medium 10 based on address information or the like of the optical head 22 due to detection signals from the wobbled intermittent section detection circuit 30, whereby signals are correctly recorded or read with respect to the optical recording medium 10.

Moreover, the wobbled intermittent section detection circuit 30 detects the wobbled intermittent section 12 based on the detection signals from the wobble detection circuit 24 as mentioned above, whereby the logic information "0" or "1" represented by the wobbled intermittent section 12 is detected.

More specifically, when the wobbled intermittent section 12 represents logic information "0", the wobbled intermittent section detection circuit 30 detects only the first wobbled intermittent section 12a for determining reference position as shown in FIG. 6(A).

On the other hand, when the wobbled intermittent section 12 represents logic information "1", the wobbled intermittent section detection circuit 30 detects the first wobbled intermittent section 12a and the second wobbled intermittent section 12b at a predetermined position as shown in FIG. 6(B).

In accordance with the manner as described above, the wobbled intermittent section detection circuit 30 detects the first wobbled intermittent section 12a in the wobbled intermittent section 12, while whether or not the wobbled intermittent section detection circuit 30 detects the second wobbled intermittent section 12b at the predetermined position in response to logic information "0" or "1", so that the logic information "0" or "1" derived from the wobbled intermittent section 12 can be detected.

Figure 7A:
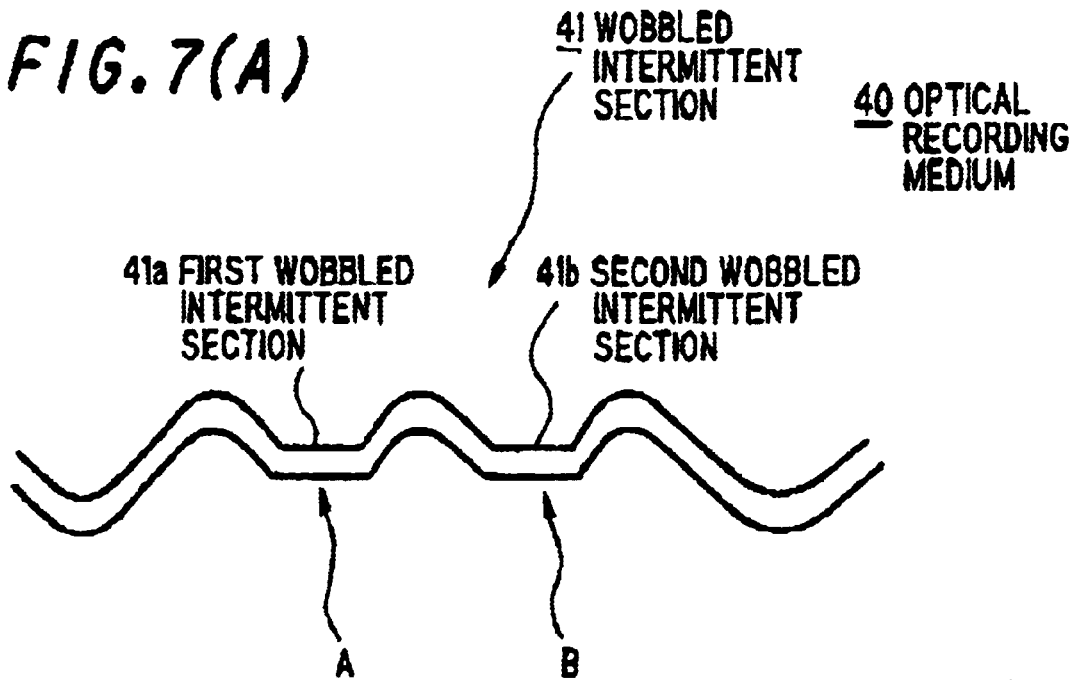
Figure 7B:
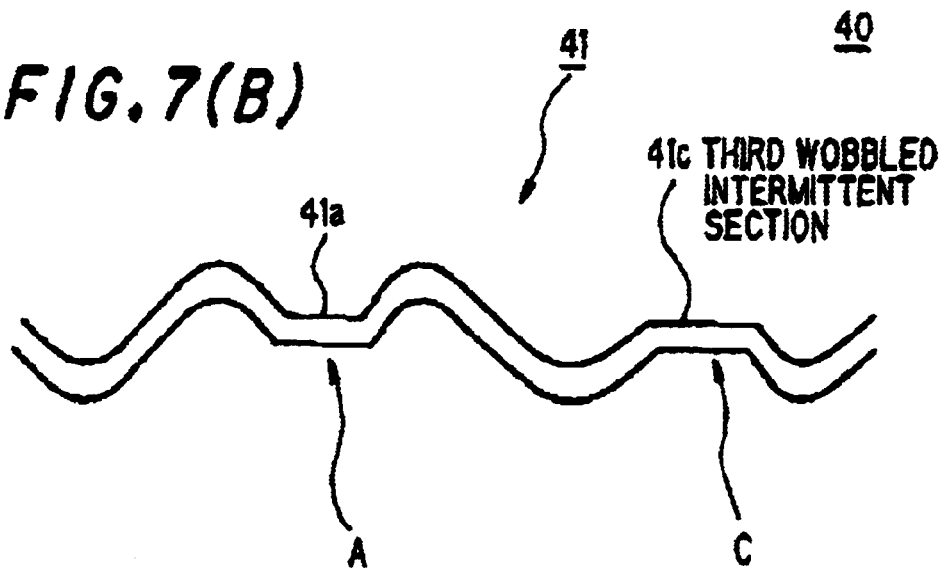

FIGS. 7(A) and 7(B) show wobbled intermittent sections in the second embodiment of an optical recording medium according to the present invention, respectively.

First, in FIG. 7(A), a wobbled intermittent section 41 in an optical recording medium 40 involves a first wobbled intermittent section 41a for determining reference position at a reference position A, and further involves a second wobbled intermittent section 41b at a predetermined position B apart from the reference position A by a predetermined first distance.

As a result of involving the second wobbled intermittent section 41b at the predetermined position B, logic information "0" is represented.

On one hand, in FIG. 7(B), the wobbled intermittent section 41 in the optical recording medium 40 involves the first wobbled intermittent section 41a for determining reference position at the reference position A as in the above case, and further involves a third wobbled intermittent section 41c at a predetermined position C apart from the reference position A by a predetermined second distance.

As a result of involving the third wobbled intermittent section 41c at the predetermined position C, logic information "1" is represented.

Thus, the wobbled intermittent section 41 is constituted in such that it involves the first wobbled intermittent section 41a for determining reference position at the reference position A, while it involves selectively either the second wobbled intermittent section 41b at the predetermined position B apart from the reference position A by the predetermined first distance, or the third wobbled intermittent section 41c at the predetermined position C apart from the reference position A by the predetermined second distance, whereby logic information "0" or "1" is represented.

In case of recording or reading the optical recording medium 40, the wobbled intermittent section detection circuit 30 detects the wobbled intermittent section 41 based on detection signals from the wobbled detection circuit 24 as mentioned before, whereby the logic information "0" or "1" represented by the wobbled intermittent section 41 is detected.

More specifically, when the wobbled intermittent section 41 represents logic information "0", the wobbled intermittent section detection circuit 30 detects the first wobbled intermittent section 41a for determining reference position and the second wobbled intermittent section 41b at the predetermined position B as shown in FIG. 8(A).

On the other hand, when the wobbled intermittent section 41 represents logic information "1", the wobbled intermittent section detection circuit 30 detects the first wobbled intermittent Section 41a for determining reference position and the third wobbled intermittent section 41c at the predetermined position C as shown in FIG. 8(B).

Hence, the wobbled intermittent section detection circuit 30 detects the first wobbled intermittent section 41a in the wobbled intermittent section 41, and further it detects either the second wobbled intermittent section 41b at the predetermined position B or the third wobbled intermittent section 41c at the predetermined position C in response to logic information "0" or "1", whereby the logic information "0" or "1", represented by the wobbled intermittent section 41 can be detected.

Figure 9A:
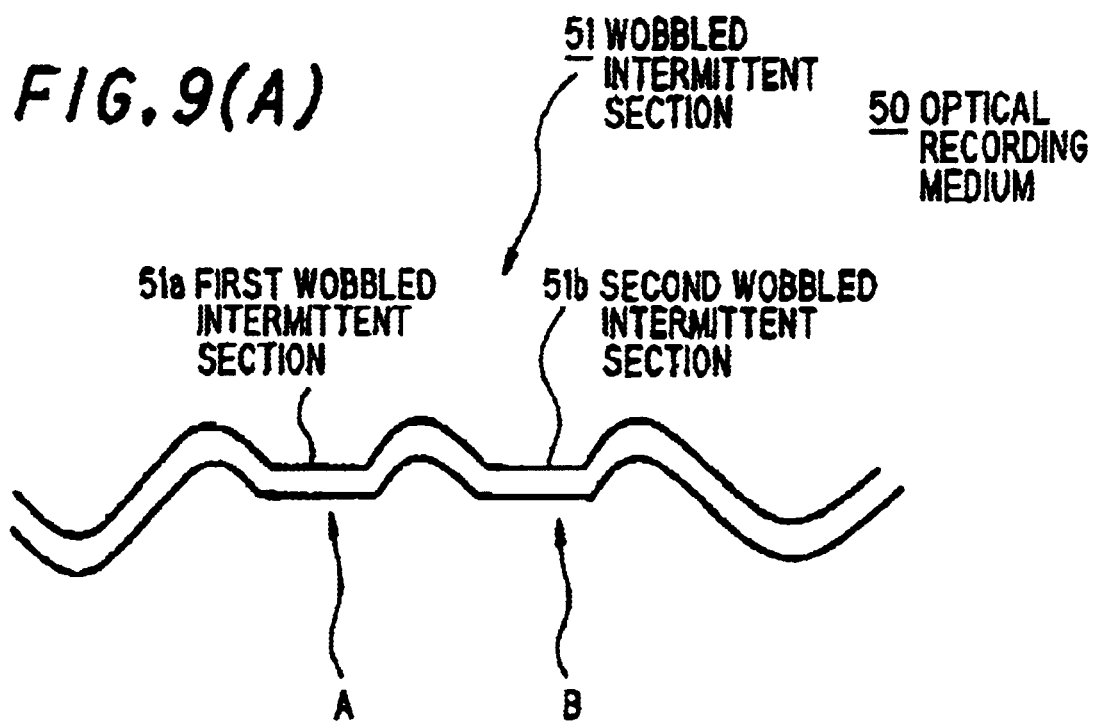
Figure 9B:
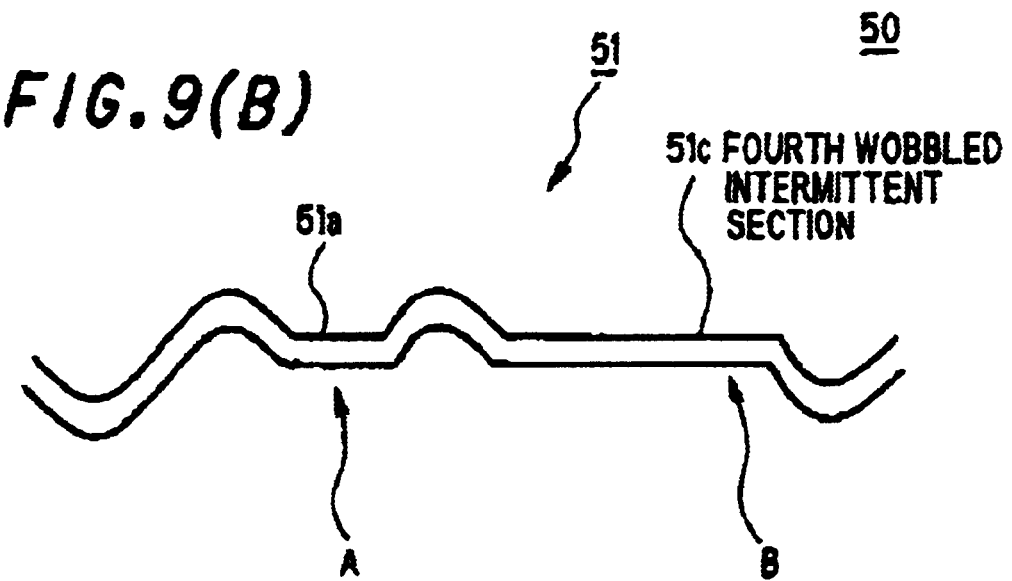

FIGS. 9(A) and 9(B) show wobbled intermittent sections in an optical recording medium of a third embodiment according to the present invention.

First, in FIG. 9(A), a wobbled intermittent section 51 in an optical recording medium 50 involves a first intermittent section 51a for determining reference position at a reference position A, while it involves also a second wobbled intermittent section 51b having a length corresponding to that of a half cycle of wobble at a predetermined position B apart from the reference position A by a predetermined distance.

As a result of involving the second wobbled intermittent section 51b at the predetermined position B, logic information "0" is represented.

On one hand, in FIG. 9(B), the wobbled intermittent section 51 in the optical recording medium 50 involves the first wobbled intermittent section 51a for determining reference position at the reference position A as in the above case, while it involves further a fourth wobbled intermittent section 51c having a length corresponding to a cycle of wobble at the predetermined position B apart from the reference position A by a predetermined distance.

As a result of involving the fourth wobbled intermittent section 51c at the predetermined position B, logic information "1" is represented, Thus, the wobbled intermittent section 51 involves the first wobbled intermittent section 51a for determining the reference position A at the reference position A, while it involves further selectively either the second wobbled intermittent section 51b having a length corresponding to a half cycle of the wobble or the fourth wobbled intermittent section 51c having a length corresponding to a cycle of the wobble at the predetermined position B apart from the reference position A by a predetermined distance, whereby the logic information "0" or "1" is represented.

In this case, a length of the wobbled intermittent section may be a natural number-fold with respect to that of half cycle of the wobble.

In case of recording or reading the optical recording medium 50 as described above, the wobbled intermittent section detection circuit 30 detects the wobbled intermittent section 51 based on detection signals from the wobbled detection circuit 24 as mentioned above, whereby logic information "0" or "1" represented by the wobbled intermittent section 51 is detected.

More specifically, when the wobbled intermittent section 51 represents logic information "0", the wobbled intermittent section detection circuit 30 detects the first wobbled intermittent section 51a for determining reference position and the second wobbled intermittent section 51b at the predetermined position B as shown in FIG. 10(A).

On the other hand, when the wobbled intermittent section 51 represents logic information "1", the wobbled intermittent section detection circuit 30 detects the first wobbled intermittent section 51a for determining reference position and the fourth wobbled intermittent section 51c at the predetermined position B as shown in FIG. 10(B).

In this case, a detection signal of the fourth wobbled intermittent section 51c is output based on a reference signal as two continuous pulse signals as shown in FIG. 10(B).

Hence, the wobbled intermittent section detection circuit 30 detects the first wobbled intermittent section 51a in the wobbled intermittent section 51, and it detects further either the second wobbled intermittent section 51b at the predetermined position B or the fourth wobbled intermittent section 51c at the predetermined position B in response to logic information "0" or "1", whereby the logic information "0", or "1" represented by the wobbled intermittent section 51 can be detected.

Thus, according to the optical recording medium 10 as well as the recording and reading device 20 for optical recording media according to the present invention, when a set composed of the first wobbled intermittent sections 12a, 41a, and 51a as well as of the other second, third or fourth wobbled intermittent sections 12b, 41b, 41c, 51b, and 51c is disposed properly on the whole surface of the optical recording medium 10, information can be represented by the wobbled intermittent sections 12, 41, and 51 without affecting adversely data signals to be recorded in the optical recording medium 10 as well as without being affected by these data signals, even if the optical recording medium 10 has been fabricated in high density.

Furthermore, the wobbled intermittent sections 12, 41, and 51 can be configured easily by stopping merely meandering motion with a simple structure in case of configuring wobble. Besides, in case of detecting information from the wobbled intermittent sections 12, 41, and 51, the information represented by these wobbled intermittent sections can be detected easily and correctly based on push-pull signals from a wobble detection circuit, which has been utilized in conventional recording and reading operations, together with the use of the wobbled intermittent detection circuit 30,

EXAMPLE 1

In the following, an example wherein a phase changing optical disk is used as an optical recording medium will be described.

The phase changing optical disk used was prepared by depositing sequentially a 170 nm thickness $ZnS$—$SiO_2$ film as an interference film, a 14 nm thickness $Ge_2Sb_2Te_5$ film as a recording film, and a 20 nm thickness ZnS—SiO2 film as a protective film on the surface of a polycarbonate substrate having 120 mm diameter, 0.74 $\mu$m track pitch, and 0.6 $\mu$m thickness, and further depositing a 100 nm thickness AlTi film as a reflection film on the protective film.

In this case, a chalcogenide material such as GeSbTe-, InSbTe-, InSe-, InTe-, AsTeGe-, TeOx-GeSn-, TeSeSn-, SbSeBi-, BiSeGe-, and AgInSbTe-based phase changing material may be used as the recording film, As the reflection film, Al, AlCr, AgPdCu or the like may be used.

Moreover, a synthetic resin such as acrylic resin, glass and the like, or the like material the surface of which has been covered with a resin or the like may be used as the substrate. In this case, a shape of the substrate is not limited to a disk-, but a card-shape is also applicable.

Wobble has been formed in such phase changing optical disk as described above, and width of the wobble is around 20 nm. Further, a wobble cycle is around 25 $\mu$m, so that when the optical disk is read, for example, at 3.49 m/s linear velocity, a push-pull signal of 140.6 kHz can be obtained as in case of DVD-RW, version 1.0.

Such formation of wobble was made by adding a circuit for stopping tentatively wobbling motion in response to information to be embedded to a master writer of usually one beam. When such one beam master writer is used, a substrate could be prepared very simply and easily.

In order to compare an optical recording medium of the present invention with a DVD-RW, a combination of the wobbled intermittent sections shown in FIG. 2 was embedded at a position of SYNC as one bit as in the case of the DVD-RW wherein one block is composed of 208 bits in also the optical recording medium of the invention as in the case of the DVD-RW.

An error rate per block (BLER) was measured before and after The recording data by the use of the wobbled intermittent section detection circuit 30.

As a result, such very low values that an error rate before recording data was around 2%, and an error rate after recording data was around 4% were obtained in an optical recording medium of the present invention.

On the other hand, such error rate was also measured in a commercially available DVD-RW by means of LPP, so that an error rate before recording data was around 6%, while an error rate after recording data was around 18%.

As a result of the above measurement, it was confirmed that information represented by the wobbled intermittent section 12 in the optical recording medium 10 according to the present invention could be detected at high degree of accuracy, and further, such remarkable characteristic that the BLERs were not so remarkably changed before and after recording data, besides they were maintained at low values was also confirmed.

EXAMPLE 2

Next, a phase changing optical disk having the same constitution as that of Example 1 was used wherein a combination of the wobbled intermittent section 41 shown in FIGS. 7(A) and 7(B) was processed as one bit, and information was embedded at a position of SYNC as in the case of DVD-RW.

In this case, an error rate before recording data was around 2%, while an error rate after recording data was around 4%, and hence, very low values were obtained as in Example 1.

EXAMPLE 3

Then, a phase changing optical disk having the same constitution as that of Example 1 was used wherein a combination of the wobbled intermittent sections 51 shown in FIG. 9 was processed as one bit, and information was embedded at a position of SYNC as in the case of DVD-RW.

In this case, an error rate before recording data was around 2%, while an error rate after recording data was around 4%, and hence, very low values were also obtained as in the above-described Examples 1 and 2.

EXAMPLE 4

Finally, a phase changing optical disk having the same constitution as that of Example 1 was used wherein a combination of the wobbled intermittent sections 12 shown in FIGS. 2(A) and 2(B) was processed as one bit and further, a length of from the reference position A to the predetermined position B was made to be a length corresponding to two cycles of wobble, and information was embedded at a position of SYNC as in the case of DVD-RW.

In this case, information corresponding to four bits can be embedded in one set, and wobble an amount of which corresponds to eight cycles exist in a distance defined between SYNCS, so that wobbled intermittent sections are formed at positions of ⅜ wobble. Accordingly, 38% of recorded data are influenced by the wobbled intermittent sections (It is considered that when the wobbled intermittent sections increase further, signals of the wobble itself become difficult to obtain).

In this case, an error rate before recording data was around 3%, while an error rate after recording data was around 5%, and hence, very low values were also obtained as in the above-described Examples 1 through 3. As a result of measuring jitter in data recorded, a value of around 8% (clock ratio) was obtained, and this value was the same as that of DVD-RW.

As described above, it was confirmed that very high detection accuracy could be obtained with respect to information represented by wobbled intermittent sections, and it was further confirmed that data recorded was mutually affected very slightly by the wobbled intermittent sections 12, 41, and 51.

Moreover, since information can be embedded in many sections of an optical disk, mass storage of embedded information is attained.

In the above-mentioned embodiments, although a length of one set containing the first wobbled intermittent sections and the other wobbled intermittent sections in the wobbled intermittent sections 12, 41, and 51 is selected to be one and half (1.5) cycle of wobble, the invention is not limited thereto, but the length may be natural number-fold of a half cycle of wobble.

Furthermore, although each of the first wobbled intermittent sections 12a, 41a, and 51a in the wobbled intermittent sections 12, 41, and 51 has a length corresponding to a half cycle of wobble in the above-mentioned embodiments, the invention is not limited thereto, but it may have, for example, a length corresponding to one cycle of wobble, or wobbled intermittent sections may be formed in every half cycles of wobble.

Still further, while a distance defined from the reference position A to the predetermined position B in the wobbled intermittent section 12, 41, or 51 is selected to be one cycle of wobble in the above-mentioned embodiments, the invention is not limited thereto, but the distance may be properly selected.

Yet further, while the wobbled intermittent sections 12, 41, and 51 are arranged to represent a binary digit being logic information "0" or "1", respectively, the invention is not limited thereto, but it is also possible to form logic of multiple digit.

As described above, according to the present invention, since wobbled intermittent sections representing logic signals corresponding to information to be recorded are allowed to involve with respect to wobble derived from a meandrous guide groove, information contained in such wobble can be correctly read in response to high density of an optical recording medium in comparison with a case where conventional wobble is FM modulated, or pits are defined between grooves.

Since it has been arranged in such that information is represented by wobbled intermittent sections in the present invention, there is neither such a case where data signals to be recorded on an optical recording medium are affected by wobbled intermittent sections, nor a case where information represented by wobbled intermittent sections are affected by data signals as in the case of LPP.

In this case, since wobbled intermittent sections can be formed in any parts of wobble configured in an optical recording medium, it is possible to embed information represented by the wobbled intermittent sections over the whole surface of the optical recording medium.

In such case as described above, since a second, a third or a fourth wobbled intermittent section in which information has been actually embedded is disposed at a predetermined position with respect to a first wobbled intermittent section placed at a reference position, there is no case where wobbled intermittent sections cannot obtain consecutively wobble signals. Thus, rotational control for an optical recording medium, which utilizes wobble signals, can be correctly effected.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An optical recording medium involving a guide groove wherein the guide groove is allowed to meander over substantially the whole length thereof to form wobble, and wobbled intermittent sections where there is no meandrous area are placed at predetermined positions in said wobble, comprising:

a first wobbled intermittent section for determining reference position being disposed at at least one reference position in said optical recording medium; and a second wobbled intermittent section being disposed selectively at each predetermined position apart from each reference position by a predetermined distance.

2. An optical recording medium as claimed in claim 1, wherein:

said first or second wobbled intermittent section has a length corresponding to natural number-fold of a half cycle of the part other than said wobbled intermittent section in said wobble.

3. A method for recording and reading signals with respect to an optical recording medium claimed in claim 1, comprising the steps of:

detecting a first wobbled intermittent section for determining reference position placed at at least one reference position in said optical recording medium from push-pull signals detected from wobble;

thereafter, detecting a wobbled intermittent section or wobbled intermittent sections other than said first wobbled intermittent section each of which is selectively disposed at a predetermined position apart from said reference position by a predetermined distance; and utilizing information which has been recorded in said wobbled intermittent section or sections other than said first wobbled intermittent section to record or read said signals with respect to said optical recording medium.

4. A method for recording and reading signals with respect to an optical recording medium as claimed in claim 3, wherein:

the signals represented by said wobbled intermittent sections are detected by means of two comparators in each of which the upper limit is compared with the lower limit with respect to said push-pull signals as well as of reference signals in synchronization with wobble signals.

5. A method for recording and reading signals with respect to an optical recording medium as claimed in claim 3, wherein:

one of said two comparators detects a first level or higher levels of said push-pull signals, the other comparator detects a second level or lower levels of said push-pull signals, and the detection signals obtained from these comparators are compared with said reference signals, whereby signals from the wobbled intermittent sections are detected.

6. A method for recording and reading signals with respect to an optical recording medium as claimed in claim 4, wherein:

one of said two comparators detects a first level or higher levels of said push-pull signals, the other comparator detects a second level or lower levels of said push-pull signals, and the detection signals obtained from these comparators are compared with said reference signals, whereby signals from the wobbled intermittent sections are detected.

7. A method for recording and reading signals with respect to an optical recording medium as claimed in claim 4, wherein:

each cycle of said reference signals corresponds to each half cycle of said push-pull signals.

8. A method for recording and reading signals with respect to an optical recording medium as claimed in claim 5, wherein:

each cycle of said reference signals corresponds to each half cycle of said push-pull signals.

9. A method for recording and reading signals with respect to an optical recording medium as claimed in claim 6 wherein:

each cycle of said reference signals corresponds to each half cycle of said push-pull signals.

10. A device for recording and reading signals with respect to an optical recording medium claimed in claim 1, comprising:

a first wobbled intermittent section for determining reference position placed at at least one reference position in said optical recording medium from push-pull signals detected from wobble;

a wobbled intermittent section detecting section for detecting a wobbled intermittent section or wobbled intermittent sections other than said first wobbled intermittent section each of which is selectively disposed at a predetermined position apart from said reference position by a predetermined distance; and a control section for taking out information, which has been recorded in said wobbled intermittent section or sections other than said first wobbled intermittent section, based on detection signals from said wobbled intermittent section detecting section and utilizing said information thereby to record or read signals with respect to said optical recording medium.

11. An optical recording medium involving a guide groove wherein the guide groove is allowed to meander over substantially the whole length thereof to form wobble, and wobbled intermittent sections where there is no meandrous area are placed at predetermined positions in said wobble, comprising:

a first wobbled intermittent section for determining reference position being disposed at at least one reference position in said optical recording medium; and second and third wobbled intermittent sections, each being disposed selectively at at least one predetermined position apart from each reference position by a predetermined distance, said second and third wobbled intermittent sections differing from one another.

12. An optical recording medium as claimed in claim 11, wherein:

said first, second or third wobbled intermittent section has a length corresponding to natural number-fold of a half cycle of the part other than said wobbled intermittent section in said wobble.

13. A method for recording and reading signals with respect to an optical recording medium claimed in claims 11, comprising the steps of:

detecting a first wobbled intermittent section for determining reference position placed at at least one reference position in said optical recording medium from push-pull signals detected from wobble;

thereafter, detecting a wobbled intermittent section or wobbled intermittent sections other than said first wobbled intermittent section each of which is selectively disposed at a predetermined position apart from said reference position by a predetermined distance; and utilizing information which has been recorded in said wobbled intermittent section or sections other than said first wobbled intermittent section to record or read said signals with respect to said optical recording medium.

14. A method for recording and reading signals with respect to an optical recording medium as claimed in claim 13, wherein:

the signals represented by said wobbled intermittent sections are detected by means of two comparators in each of which the upper limit is compared with the lower limit with respect to said push-pull signals as well as of reference signals in synchronization with wobble signals.

15. A method for recording and reading signals with respect to an optical recording medium as claimed in claim 13, wherein:

one of said two comparators detects a first level or higher levels of said push-pull signals, the other comparator detects a second level or lower levels of said push-pull signals, and the detection signals obtained from these comparators are compared with said reference signals, whereby signals from the wobbled intermittent sections are detected.

16. A method for recording and reading signals with respect to an optical recording medium as claimed in claim 14, wherein:

one of said two comparators detects a first level or higher levels of said push-pull signals, the other comparator detects a second level or lower levels of said push-pull signals, and the detection signals obtained from these comparators are compared with said reference signals, whereby signals from the wobbled intermittent sections are detected.

17. A method of recording and reading signals with respect to an optical recording medium as claimed in claim 14, wherein:

each cycle of said reference signals corresponds to each half cycle of said push-pull signals.

18. A method for recording and reading signals with respect to an optical recording medium as claimed in claim 15, wherein:

each cycle of said reference signals corresponds to each half cycle of said push-pull signals.

19. A method for recording and reading signals with respect to an optical recording medium as claimed in claim 16, wherein:

each cycle of said reference signals corresponds to each half cycle of said push-pull signals.

20. A device for recording and reading signals with respect to an optical recording medium claimed in claim 11, comprising:

a first wobbled intermittent section for determining reference position placed at at least one reference position in said optical recording medium from push-pull signals detected from wobble;

a wobbled intermittent section detecting section for detecting a wobbled intermittent section or wobbled intermittent sections other than said first wobbled intermittent section each of which is selectively disposed at a predetermined position apart from said reference position by a predetermined distance; and a control section for taking out information, which has been recorded in said wobbled intermittent section or sections other than said first wobbled intermittent section, based on detection signals from said wobbled intermittent section detecting section and utilizing said information thereby to record or read signals with respect to said optical recording medium.

21. An optical recording medium involving a guide groove wherein the guide groove is allowed to meander over substantially the whole length thereof to form wobble, and wobbled intermittent sections where there is no meandrous area are placed at predetermined positions in said wobble, comprising:

a first wobbled intermittent section for determining reference position being disposed at at least one reference position in said optical recording medium; and second, third and fourth wobbled intermittent sections, said second, third and fourth wobbled intermittent sections each having a different length from one another, and each being disposed selectively at each predetermined position apart from each reference position by a predetermined distance.

22. An optical recording medium as claimed in claim 21, wherein:

said first, second, third, or fourth wobbled intermittent section has a length corresponding to natural numberfold of a half cycle of the part other than said wobbled intermittent section in said wobble.

23. A method for recording and reading signals with respect to an optical recording medium claimed in claim 21, comprising the steps of:

detecting a first wobbled intermittent section for determining reference position placed at at least one reference position in said optical recording medium from push-pull signals detected from wobble;

thereafter, detecting a wobbled intermittent section or wobbled intermittent sections other than said first wobbled intermittent section each of which is selectively disposed at a predetermined position apart from said reference position by a predetermined distance; and utilizing information which has been recorded in said wobbled intermittent section or sections other than said first wobbled intermittent section to record or read said signals with respect to said optical recording medium.

24. A method for recording and reading signals with respect to an optical recording medium as claimed in claim 23, wherein:

the signals represented by said wobbled intermittent sections are detected by means of two comparators in each of which the upper limit is compared with the lower limit with respect to said push-pull signals as well as of reference signals in synchronization with wobble signals.

25. A method for recording and reading signals with respect to an optical recording medium as claimed in claim 23, wherein:

one of said two comparators detects a first level or higher levels of said push-pull signals, the other comparator detects a second level or lower levels of said push-pull signals, and the detection signals obtained from these comparators are compared with said reference signals, whereby signals from the wobbled intermittent sections are detected.

26. A method for recording and reading signals with respect to an optical recording medium as claimed in claim 24, wherein:

one of said two comparators detects a first level or higher levels of said push-pull signals, the other comparator detects a second level or lower levels of said push-pull signals, and the detection signals obtained from these comparators are compared with said reference signals, whereby signals from the wobbled intermittent sections are detected.

27. A method of recording and reading signals with respect to an optical recording medium as claimed in claim 24, wherein:

each cycle of said reference signals corresponds to each half cycle of said push-pull signals.

28. A method for recording and reading signals with respect to an optical recording medium as claimed in claim 25, wherein:

each cycle of said reference signals corresponds to each half cycle of said push-pull signals.

29. A method for recording and reading signals with respect to an optical recording medium as claimed in claim 26, wherein:

each cycle of said reference signals corresponds to each half cycle of said push-pull signals.

30. A device for recording and reading signals with respect to an optical recording medium claimed in claim 21, comprising:

a first wobbled intermittent section for determining reference position placed at at least one reference position in said optical recording medium from push-pull signals detected from wobble;

a wobbled intermittent section detecting section for detecting a wobbled intermittent section or wobbled intermittent sections other than said first wobbled intermittent section each of which is selectively disposed at a predetermined position apart from said reference position by a predetermined distance; and a control section for taking out information, which has been recorded in said wobbled intermittent section or sections other than said first wobbled intermittent section, based on detection signals from said wobbled intermittent section detecting section and utilizing said information thereby to record or read signals with respect to said optical recording medium.

* * * * *

UNITED STATES PATENT AND TRADEMARK OFFICE
CERTIFICATE OF CORRECTION

| | | |
|---|---|---|
| PATENT NO. | : 6,925,049 B2 | |
| APPLICATION NO. | : 10/092105 | |
| DATED | : August 2, 2005 | |
| INVENTOR(S) | : Ogawa | |

It is certified that error appears in the above-identified patent and that said Letters Patent is hereby corrected as shown below:

On the title page

Delete Foreign Application Priority Data JP 2001-059807 from section [30].

Signed and Sealed this

Eleventh Day of July, 2006

JON W. DUDAS
*Director of the United States Patent and Trademark Office*